United States Patent [19]

Vetter

[11] 4,043,522

[45] Aug. 23, 1977

[54] COMMON POD FOR HOUSING A PLURALITY OF DIFFERENT TURBOFAN JET PROPULSION ENGINES

[75] Inventor: Earl E. Vetter, Mercer Island, Wash.

[73] Assignees: The Boeing Company, Seattle, Wash.; Aeritalia S.p.A., Naples, Italy

[21] Appl. No.: 642,787

[22] Filed: Dec. 22, 1975

[51] Int. Cl.² .................................... B64D 29/00
[52] U.S. Cl. ...................................... 244/54; 248/5
[58] Field of Search ................ 244/54, 53 R; 248/5; 60/226 R, 39.31

[56] References Cited

U.S. PATENT DOCUMENTS

| | | | |
|---|---|---|---|
| 2,234,394 | 3/1941 | Amiot | 244/54 |
| 2,372,905 | 4/1945 | McKinnie | 244/54 |
| 2,539,960 | 1/1951 | Marchant et al. | 244/54 X |
| 2,711,866 | 6/1955 | Bentz | 244/54 |
| 2,783,003 | 2/1957 | Ralston et al. | 248/5 X |
| 2,965,338 | 12/1960 | McLean | 248/5 |
| 3,201,070 | 8/1965 | Chilvers | 244/54 |
| 3,352,114 | 11/1967 | Wilde et al. | 244/54 X |
| 3,397,855 | 8/1968 | Newland | 244/54 |
| 3,448,945 | 6/1969 | Ascani | 244/54 X |
| 3,735,946 | 5/1973 | Mullins | 244/54 |
| 3,809,340 | 5/1974 | Dolgy et al. | 244/54 |
| 3,837,602 | 9/1974 | Mullins | 244/54 |

FOREIGN PATENT DOCUMENTS 1,375,868  11/1974  United Kingdom ................... 244/54

Primary Examiner—Trygve M. Blix
Assistant Examiner—Barry L. Kelmachter

Attorney, Agent, or Firm—Christensen, O'Connor, Garrison & Havelka

[57] ABSTRACT

A pod for mounting a turbofan jet propulsion engine on a strut is constructed so that a common cowl and portions of the fan air duct and turbine exhaust duct can accomodate a plurality of different turbofan engines that have substantially the same thrust rating but have variations in structural dimensions. The portions of the pod common to all such engines include an annular cowl, an inlet throat that merges into the forward end of the cowl to form an inlet highlight, a rearward portion of the outer fan duct wall, a rearward portion of the inner fan duct wall and a turbine nozzle. The common portions of the pod structure are designed about a common datum plane orthogonally oriented relative to the pod center line. The rear face of the turbine casing of each of the turbofan jet propulsion engines is positioned in this datum plane when mounted in the pod. An annular inlet adapter forms an inlet wall that couples the rearward edge of the inlet throat to the forward, peripheral portion of the engine fan casing. Outer and inner fan duct wall adapters couple the common outer and inner portions of the fan duct walls to the engine fan casing at the datum plane. A fan nozzle adapter ring is attached to the rear portion of the cowl and the outer fan duct wall to provide an appropriately dimensioned fan nozzle exit opening. The turbine outlet of at least one of the engines can be coupled directly to the common nozzle of the pod. An annular adapter ring is coupled between the forward edge of the common nozzle and the rearward face of the turbine engine outlet on those engines having a lesser longitudinal dimension.

11 Claims, 6 Drawing Figures

COMMON POD FOR HOUSING A PLURALITY OF DIFFERENT TURBOFAN JET PROPULSION ENGINES

BACKGROUND OF THE INVENTION

The present invention relates to pod structure for housing jet propulsion engine for use on airplanes, and more particularly, to a pod attached to a wing-supported strut that has common structure for housing a variety of different turbofan jet propulsion engines.

A number of different manufacturers build turbofan jet propulsion engines that have approximately the same thrust rating. For example, Pratt & Whitney is designing and will manufacture a high bypass ratio turbofan jet propulsion engine having a rating of about 25,000 pounds of thrust. The Pratt & Whitney engine is denominated the JT10D. The General Electric Company has a similar engine denominated CFM56, while Rolls Royce has a similar engine designated RB235. All three engines will provide approximately the same power output. However, each of the engines has been independently designed and will be independently manufactured, resulting in overall dimensions that will vary among the engines. Examples of dimensions that will vary include the fan casing inlet and outlet diameters, the engine length, and longitudinal dimensions of the fan case. In addition, each of the engines will require a slightly different fan nozzle and primary (turbine) nozzle area that is matched to the engine's unique operating characteristics.

In the past, pods to house the jet propulsion engines have been independently designed and tailored to the unique dimensional characteristics, inlet sizes, and nozzle sizes, of each of the several engines that may be requested by a customer. The non-recurring development costs for a pod to house a particular engine currently range from fifty to ninety million dollars. Thus, if a pod is to be designed to each of three different engines, these non-recurring, development costs must be trebled. As a result, the need has arisen to significantly reduce these high developmental costs. One solution to cost reduction would be to select a single engine for incorporation into a new aircraft design. This solution, however, is impractical as purchasers of a new airplane may have a fixed preference for engines manufactured by one or another of the several engine manufacturers. Thus, selection of only one engine would necessarily and undesirably limit the range of customers who might acquire a given airplane.

Accordingly, it is a broad object of the present invention to reduce the non-recurring costs for developing a pod for housing a turbofan jet propulsion engine while developing a pod or pods that will accomodate engines from different manufacturers. It is a further object of the present invention to provide a pod for housing a variety of turbofan jet propulsion engines that has a large proportion of common components and that can be easily adapted to receive the variety of engines. A further object of the present invention is to provide a pod for housing a variety of jet propulsion engines while maintaining the development costs in the proximity of costs for developing a pod specifically for a given engine.

SUMMARY OF THE INVENTION

In accordance with the foregoing objects and other ojbects that will become apparent to one of ordinary skill in the art after reading the following specification, the present invention provides a pod for housing a plurality of turbofan jet propulsion engines supplied by different manufacturers that employs common structure for all such engines while using adaptive parts to accomodate the various engines to the common structure. A key feature of the invention is the selection of the rear face of the fan cowl of each of the engines as a datum plane for locating the engines within the common pod structure, thereby maintaining the center of gravity of all the pod/engine structures substantially the same and not significantly altering the flutter characteristics of the wing when the various engines are mounted. The common pod structure includes a fixed, annularly shaped cowl that surrounds the engine/pod center line and extends rearwardly and forwardly from the datum plane. A fixed, annular inlet throat is positioned adjacent the forward portion of the cowl and is spaced radially inwardly therefrom. The forward portion of the cowl radially converges to mate with a radially diverging forward portion of the inlet throat to form an inlet highlight. The throat terminates in a rearward edge spaced forwardly from the datum plane and the forward face of the fan casing. An annular inlet adapter joins the rearward edge of the outlet throat to the forward peripheral portion of the fan casing. The inlet adapter is constructed and dimensioned so as to properly contour the inlet channel from the fixed inlet throat to the fan casing of a given engine. A fixed, annular, outer fan duct wall is located radially inwardly from the cowl and terminates in a forward edge at a location rearwardly from the datum plane. The outer fan duct wall extends rearwardly toward and is connected to the cowl. An inner, annular, fan duct wall is located radially inwardly from the outer fan duct wall and extends rearwardly from a forward edge spaced rearwardly from the datum plane. A fixed turbine nozzle of annular configuration is positioned radially inwardly from the inner fan duct wall and extends from a forward edge spaced rearwardly from the datum plane to a turbine nozzle exit opening. The nozzle structure is designed so that the forward edge thereof can be connected directly to the turbine outlet of the turbofan engine having the greatest longitudinal dimension. For those engines having a lesser longitudinal dimension, an annular adapter is inserted between the turbine outlet and the forward edge of the fixed turbine nozzle. Likewise, annular adapters are employed to interconnect the rear face of the fan casing to the fixed outer and inner fan duct walls.

Not only do the various adapters for a given engine, including the inlet adapters, the fan duct adapters, and the nozzle adapter if necessary, accomodate the varying longitudinal dimensions of the given engines but they also can be contoured in the radial dimension so as to accomodate diameter variations in the fan casing and nozzle outlets. In addition to the foregoing, a fan nozzle adapter having an annular configuration is affixed to the rear portions of the cowl and the outer fan duct wall to form a fan nozzle opening. The fan nozzle adapter is properly dimensioned so that the area of the fan nozzle opening meets the particular back pressure requirements of a given turbofan engine. Moreover, the turbine nozzle area can be varied among the different engines by employing a nozzle plug of the required geometry inside the fixed turbine nozzle.

By employing the adaptive pod concept outlined above, the non-recurring developmental costs for pods that wil accomodate, for example, three different engines can be reduced from an estimated maximum of two hundred seventy million dollars for separate pods to less than one hundred million dollars for a pod that will adapt to accomodate all three of the given engines. Moreover, assuming a learning curve of 85% during continued production of the adaptive pod of the present invention, an additional savings of from two hundred to four hundred million dollars can be realized when only a thousand of the pods have been manufactured and sold. Thus, although the present invention appears with hindsight to be relatively simple, the full import of the concept resides not only in its adaptability and universal use with a variety of engines, but also in the significant cost savings to the aircraft manufacturer.

BRIEF DESCRIPTION OF THE DRAWINGS

A better understanding of the present invention can be derived by reading the ensuing specification in conjunction with the accompanying drawings wherein.

DETAILED DESCRIPTION

Figure 1:
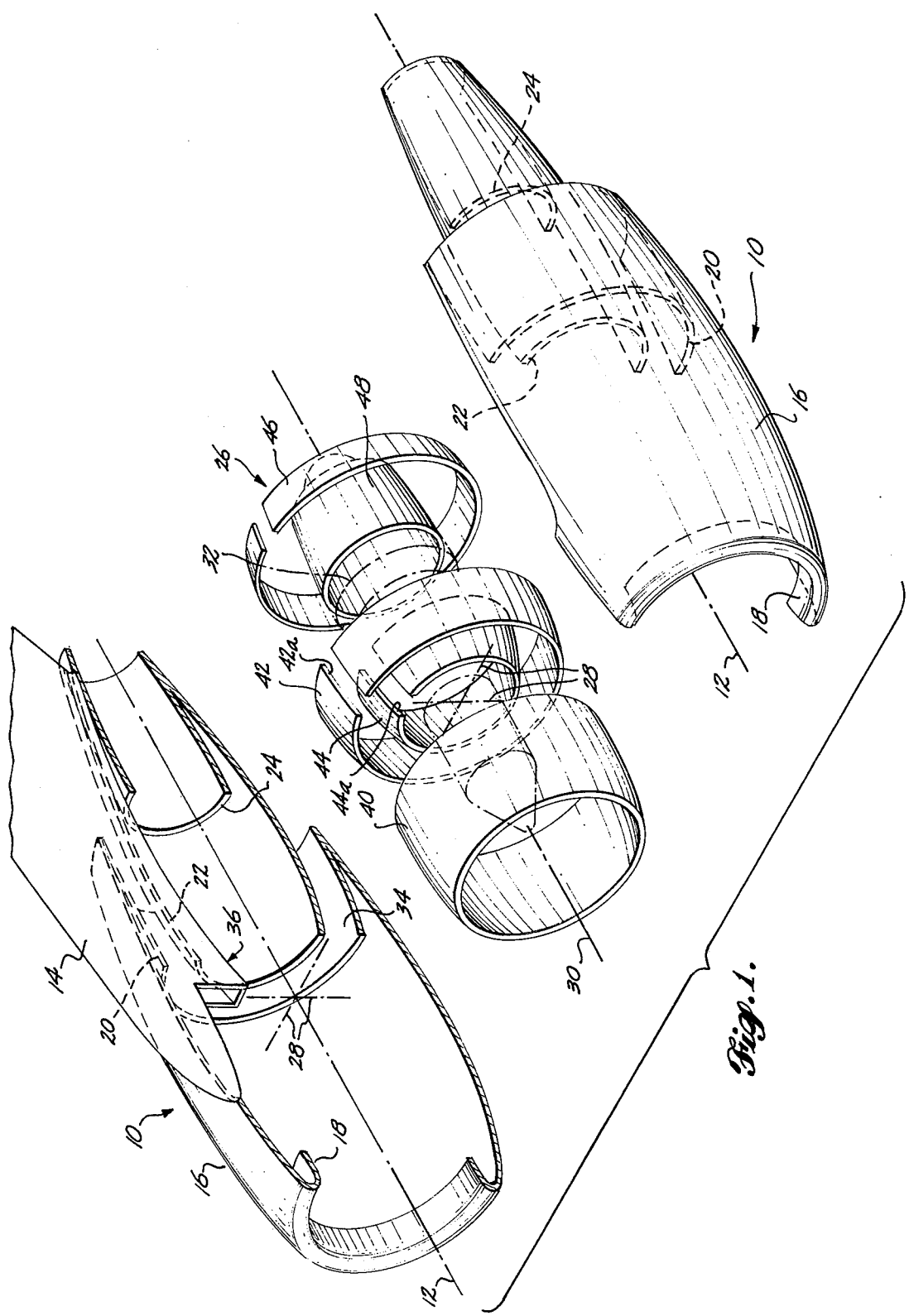
FIG. 1 is an exploded isometric view of the jet engine pod of the present invention showing the fixed or common portions of the pod, the adapters, and a turbonfan jet propulsion engine in ghost outline.

FIG. 1 is intended to be illustrative of the concept of the present invention. The fixed pod structure 10 of the jet engine pod is separated substantially along a vertical, longitudinal plane lying along the center line 12 of the pod. In practice, the pod may not be constructed in a manner so that it can be separated along this vertical, longitudinal plane but may be constructed so that portions of the pod are fixed to the strut 14 in turn mounted on a wing (not shown) with removable panels on the bottom portion of the fixed pod structure 10 to facilitate insertion and removal of the engine and adapters from the bottom of the pod therein. The fixed components of the pod include a cowl 16, an inlet throat 18, an outer fan duct wall 20, an inner fan duct wall 22 and a primary or turbine nozzle 24. The fixed pod structure 10, as well as the adaptive components 26 (to be described in greater detail below), is desigend around a datum plane 28 defined by vertical and horizontal lines orthogonally intersecting the center line 12 of the pod and the center line 30 cf a representative turbofan jet propulsion engine 32 (shown in ghost outline).

The representative jet propulsion engine 32 is of conventional design employing a high bypass fan of relatively large diameter driven by a turbine engine. The fan has an outer casing and an inner casing defining an annular cavity in which the fan is mounted. Conventionally, the inlet duct of a mounting pod is fitted to the forward edge of the outer casing while fan duct walls are fitted to the rearward edges of the inner and outer fan casing. These rearward edges will hereinafter be referred to as the rearward, inner and outer edges of the fan casing. A turbine casing surrounds the high pressure compressor, the burner and the turbine of the turbine engine. Exhaust gases from the turbine exit from a turbine outlet normally situated at the rearward end of the turbine casing. The datum plate 28 referred to above is chosen so that the rear face of the fan casing of each of the different turbofan engines that can be adapted to fit the pod of the present invention lies at the same location in the fixed pod structure when mounted. The datum plane is chosen at this location primarily because the centers of gravity of each of the different turbofan engines lie in or very close to the plane defined by the rear face of the fan casing. Moreover, most of the accessories such as power take-off components and engine starters, supplied with the engines by the manufacturers, are normally located adjacent or partially lying within the datum plane. Thus, when the datum plane is so chosen and oriented relative to the fixed pod structure and the mounting strut 14, the flutter characteristics of a given engine in its mounting will not significantly vary among the different engines. Moreover, the accessory locations for the given engines need not be significantly changed to be accomodated within the fixed pod structure 10 and the mounting strut 14.

The cowl 16 is of annular configuration and in this embodiment has a circular cross-section with its axis coincident with the pod center line 12. It extends rearwardly from the datum plane and slightly radially converges to a location about midway along the longitudinal dimension of the strut 14 adjacent the pod. The cowl also extends forwardly toward the nose of the pod from the datum plane 28 in a smooth continuation of the rearward portion. Adjacent the nose, the cowl rapidly radially converges to the inlet highlight, the forwardmost point of the pod. An annular inlet throat 18 is spaced radially inwardly from the nose of the cowl 16 and surrounds the center line 12 of the pod. The forward portion of the inlet throat 18 radially diverges to merge with the converging nose portion of the cowl 16, thereby forming a smooth transition from the throat through the highlight to the cowl 16. The inlet throat 18 terminates in a rearward edge defining a throat plate oriented orthogonally to the pod center line 12. The rear edge of the throat 18 is positioned well forwardly of the datum plane 28 and is located forwardly from the location at which the forward fan casing face of any of the various engines will be when mounted.

The fixed, outer fan duct wall 20 is positioned radially inwardly from the rearward portion of the cowl 16. The forward edge of the outer fan duct wall 20 defines a plane oriented orthogonally to the pod center line 12 and is positioned rearwardly from the datum plane 28. The outer fan duct wall 20 slightly radially diverges as it extends rearwardly from its forward edge and terminates at a location adjacent the rearward end of the cowl 16. As illustrated, the rearward portion of the outer fan duct wall 20 merges into the forward portion of the cowl 16. In actual practice, the outer fan duct wall 20 can be separated from the cowl 16, but generally will be affixed by spacers or by direct bonding, to the cowl 16. The fixed inner fan duct wall 22 is spaced radially inwardly from the outer fan duct walls 20 and has a forward edge defining a plane that is oriented orthogonally to the pod center line 12 and positioned rearwardly from the datum plane 28. If desired, the plane defined by the forward edge of the inner fan duct wall 22 can be coplanar with the plane defined by the forward edge outer fan duct wall 20. The inner fan duct wall 22 first slightly radially diverges as it extends rearwardly from its forward edge. The inner and outer fan duct walls 22 and 20 thus define an annular fan duct for channelling fan air rearwardly from an engine mounted in the pod.

The annularly shaped turbine nozzle 24 is positioned radially inwardly from the inner fan duct wall 22 and surrounds the pod center line 12. The forward edge of the turbine nozzle (sometimes referred to as the primary nozzle) defines a plane that is oriented orthogonally to the pod center line 12 and positioned rearwardly from the datum plane and from the forward edges of the inner and outer fan duct walls 20 and 22. The turbine nozzle 24 extends rearwardly from its forward edge and terminates in a rearward opening that serves as the turbine nozzle outlet. The turbine nozzle opening also lies in a plane that is orthogonally oriented relative to the pod center line 12. The inner fan duct wall 22 slightly radially converges toward the nozzle 24 as it extends rearwardly from the cowl 16 and merges into the nozzle 24 to form a single panel adjacent the nozzle opening. This panel forms a smooth aerodynamic extension of the inner fan duct wall so as to provide undisturbed rearward flow of fan air from the engine. In actual practice, the inner fan duct wall 22 and the turbine nozzle 24 can be separated and fitted with a fairing at the rearward edge to form a smooth aerodynamic transistion between the rearward end of the inner fan duct wall and the nozzle. In any event, the nozzle and the inner fan duct wall can be structurally united by suitable interconnecting elements (not shown).

The strut 14, not forming a part of the present invention, is fitted to the upper portion of the fixed pod structure and is faired into the outer surface of the cowl 16. A box-like structure 36 extends generally radially into the fixed pod structure 10 toward the pod center line 12. The box structure 36 has spaced, substantially parallel side walls that extend from the bottom of the strut downwardly to and through the location of the inner fan duct wall. The forward end of the box structure 36 terminates in a forward face defining a substantially rectangular opening that lies in or immediately adjacent the datum plane 28. The box structure 36 extends through the upper portions of the fixed outer fan duct wall 20 and the forward portion of the fixed inner fan duct wall 22. The box structure 36 further serves to bifurcate the otherwise complete annular fan duct 34 defined between the inner and outer fan duct wall 20 and 22 along its upper region. In practice, this box structure 36 servs as an access opening from the interior of the strut 14 directly to the turbofan engine to be mounted within the fixed pod structure 10. Moreover, accessory conduits such as fan bleed air conduits, high pressure bleed air conduits and fuel lines can be routed through the interior of the box structure 36 directly to the engine. Moreover, the mounting beam, normally extending from fixed structure on the airplane, such as the wing, extends through the center portion of the strut 14 and through the box structure 36 for direct attachment to the engine.

Referring to the center portion of FIG. 1, a turbofan jet propulsion engine 32 of a given configuration is chosen as representative of one of the plurality of turbofan jet propulsion engines that can be adapted to fit into the fixed pod structure 10 just described. The engine 32 is positioned within the pod so that the rear face of the fan casing lies within the datum plane 28. When the engine is so positioned, annularly shaped adapters 40, 42, 44, 46 and 48 are employed to complete the pod installation. The inlet adpater 40 is constructed so that its forward edge mates with the rearward edge of the inlet throat 18 and flares or slightly radially diverges as it extends rearwardly so that its rearward edge mates with the outer peripheral portion of the fan casing. In this manner, the adapter 40 forms the inlet or air intake channel 56 that extends from the throat of the pod to the fan casing. The inlet adapter 40 is sized and configured so as to adapt the inlet channel to the particular longitudinal dimension and diameter of the fan casing of the representative engine 32. Moreover, the shape of the inlet adapter 40 is designed to provide the optimum air flow characteristics between the inlet throat and the fan casing.

Annularly shaped, outer fan duct wall and inner fan duct wall adapters 42 and 44 respectively bridge the gap between the rear face of the fan casing of the represenative engine 32 and the fixed outer and inner fan duct walls 20 and 22 respectively. The upper portions of the inner and outer fan duct adapters 42 and 44 are longitudinally split to form gaps 42a and 42b that provide space through which the box-like bifurcation structure 36 can extend. The gaps 42a and 42b are sized in circumferential dimension so that the edges of the gaps abut the side walls of the bifurcation structure 36. The forward edge of the outer fan duct wall adapter 42 is sized to abut and be affixed to the outer, rear, peripheral edge of the fan casing. The rearward edge of the outer wall duct wall adapter 42 is sized to mate with the forward edge of the fixed outer fan duct wall 20. The outer fan duct wall adapter 42 is sized to provide a smooth transition from the outer portion of the fan casing of the representative engine 32 to the fixed outer fan duct wall 20. Likewise, the inner fan duct wall adater 44 is sized to be affixed to the inner portion of the annular fan casing of the representative engine 32. The rearward edge of the inner fan duct wall adapter 44 mates with the forward edge of the fixed inner fan duct wall 22. The inner fan duct adapter 44 thus serves to form a smooth transition from the rearward, inner portion of the inner fan casing of the representative engine 32 to the fixed, inner fan duct wall 22. Thus the fan duct adatpers 42 and 44 form conjunctively with the fixed fan duct walls 20 and 22 a continuous annular fan duct 34 extending from the rear face of the fan casing of the representative engine 32 to the rearward portion of the outer, fixed fan duct wall 20.

Since each of the engines for which the pod of the present invention is adpated have slightly differing bypass ratios and pressure ratio requirements, the fan nozzle outlet geometry can be varied in accordance with the present invention to suit the exact requirements of a given engine. The required nozzle geometry is provided by an annular, fan nozzle adapter that is fitted to the rear portions of the cowl 16 and the outer, fixed fan duct wall 20. The fan nozzle adapter 46 is also longitudinally split along its upper portion to provide a gap 46a through which the bifurcation structure 36 can extend. The rear edge of the fan nozzle adapter 46 defines a plane orthogonally oriented relative to the center line 12 of the pod. The nozzle area is determined by the spacing between this rearward edge and the portion of the fixed, inner fan duct wall 22 located radially inwardly from this type. Thus, the fan nozzle area can be adjusted to meet the particular pressure requirements of a given engine by appropriately dimensioning the diameter of the rear edge of the fan nozzle adapter 46. The forward edge of the fan nozzle adapter 46 is sized to mate with the rearward edge of the fixed outer fan duct wall 20 and the rearward edge of the cowl 16 so that the outer surface of the fan nozzle adapter 46 forms a smooth, rearward continuation of the outer surface of the cowl 16 and so that the inner surface of the fan nozzle adapter 46 forms a smooth, rearward continuation of the inner surface of the outer fan duct wall 20.

The representative engine 32 depicted in FIG. 1 is one of several that can be adpated for use with the pod of the present invention. This particular engine has an overall longitudinal dimension that is less than the longitudinal dimension of other engines that can be employed with the fixed pod structure of the present invention. Thus, the rear face of the turbine outlet is spaced forwardly from the forward edge of the fixed turbine nozzle 24 forming a part of the fixed pod structure 10. A turbine nozzle adapter 48 of generally annular configuration is provided to bridge the gap between the rear face of the turbine outlet and the forward edge of the fixed turbine nozzle 24. The forward edge of the turbine nozzle adapter is sized to mate with and be affixed to the rearward edge of the turbine casing while the rearward edge of the turbine nozzle adapter 48 is sized to mate with the forward edge of the fixed turbine nozzle 24. The turbine nozzle adapter 48 is configured so that a smooth transition is provided by the adapter between the turbine outlet and the fixed nozzle.

Figure 2:
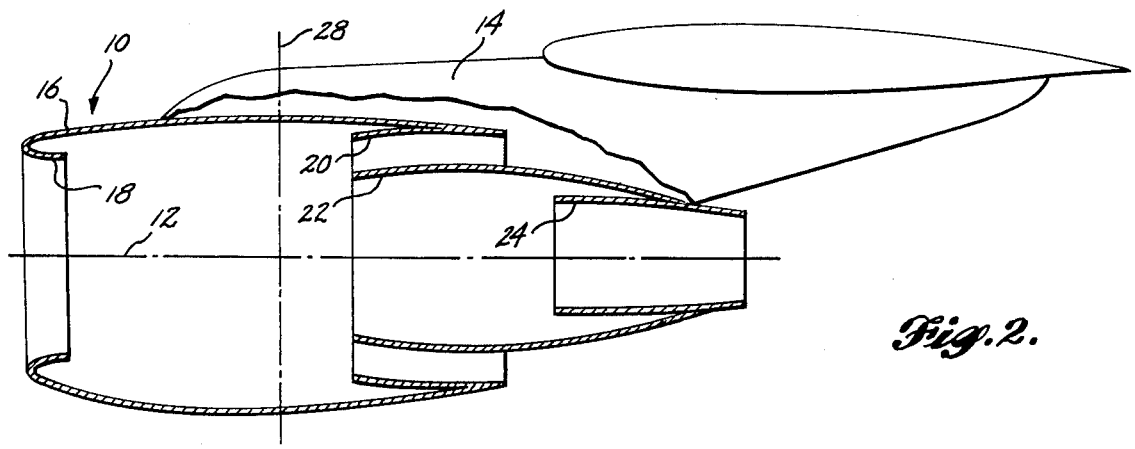
FIG. 2 is a longitudinal, sectional view of the fixed components of the adaptable pod of the present invention.
Figure 3:
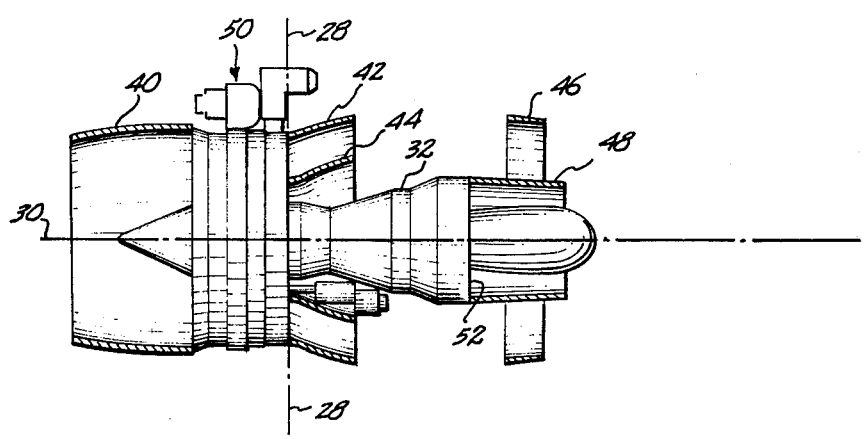
FIG. 3 is a side elevation view in partial longitudinal section showing a first turbofan jet propulsion engine with adapters attached thereto ready for insertion into the fixed pod structure illustrated in FIG. 2.

Referring now to FIGS. 2 and 3, the adapters 40, 42, 44, 46 and 48 will preferably be attached to the representative engine 32 by the engine manufacturer. The fixed pod structure 10 (FIG. 2) will normally be manufactured by the airplane manufacturer for the airplane on which the preset invention is to be used or by a subcontractor for the airplane manufacturer. In addition, engine accessories such as starters, power generators and the like, generally designated 50 will be affixed to the fan casing or other structure on the engine adjacent the datum plane 28. Thus when the engine is supplied to the airplane manufacturer, a portion of the inlet ducting formed by adapter 40 and the forward portion of the fan duct 34 formed by the fan duct adapters 42 and 44 will already be affixed to the engine. In addition, if necessary, the turbine nozzle adapter 48 will be fixed to the rear face 52 of the turbine outlet of the representative engine 32. Depending upon the design requirements of the particular engine, the fan nozzle adapter 46 can be affixed to the engine 32, can be supplied separately therewith, or can be supplied by the airplane manufacturer. In any event, the fan nozzle adapter 46 must be dimensioned to provide a particular fan nozzle area requirements of the engine 32.

Figure 4:
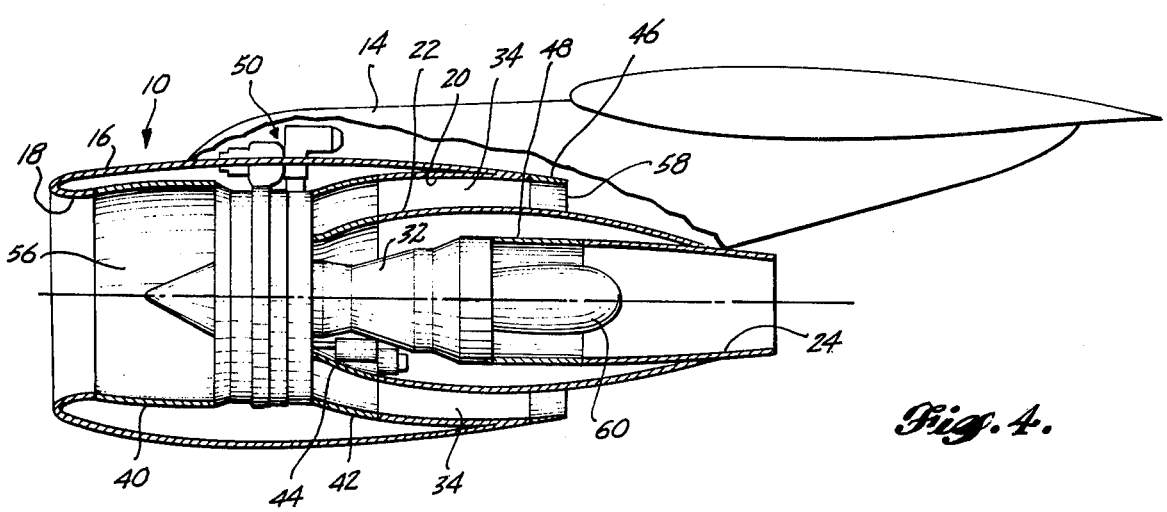
FIG. 4 is a view similar to FIGS. 2 and 3 showing the engine of FIG. 2 mounted in the fixed pod structure.

As shown in FIG. 4, the engine 32, inlet adapter 40, the fan ducts adapters 42 and 44 and the fan nozzle adapter 46 are mounted in the fixed pod structure 10 so that the adapter 40 forms the completed inlet passage 56 for the fan of the turbofan engine 32 and so that the adapters 42 and 44, in conjunction with the fixed fan duct walls 20 and 22 and the fan nozzle adapter 46, form a complete annular fan duct 34 terminating in a fan nozzle 58. In addition, the turbine nozzle adapter 48 spans the gap between the rear face 52 of the turbine and the fixed nozzle structure 24. Again, each of the several engines that can be adapted for use with the pod of the present invention have varying turbine nozzle area requirements. The fixed nozzle 24 of the present invention is not varied for the several engines that can be employed. However, the nozzle area can be adjusted, if necessary, to the desired dimensions by varying the lengths of the fixed nozzle. By increasing the size or length of the plug 60, the area of the turbine nozzle 24 can be reduced. Likewise, by reducing the size of the plug 60, the nozzle area can be increased, as desired. In most instances, the nozzle plug will be provided by the engine manufacturer and will be affixed to the engine upon delivery to the airplane manufacturer.

Figure 5:
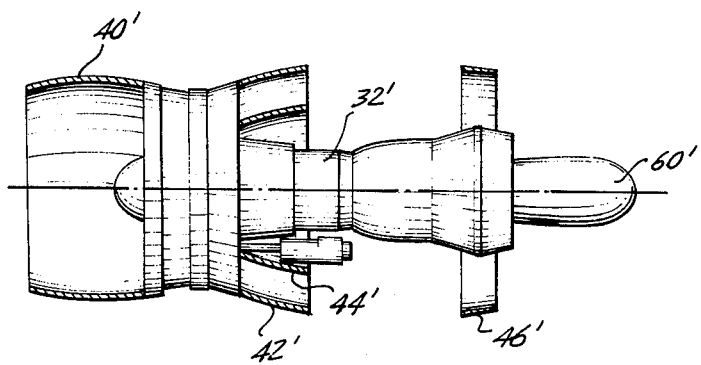
FIG. 5 is a side elevation view in partial longitudinal section of a second engine of different manufacture than that illustrated in FIG. 3 with adapters attached thereto ready for insertion into the fixed pod structure.
Figure 6:
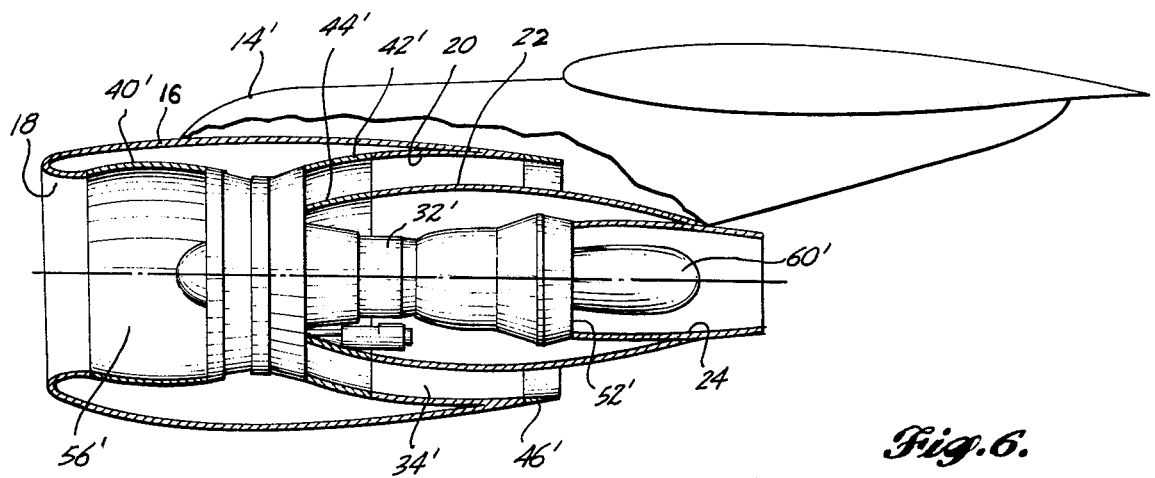
FIG. 6 is a view similar to FIG. 4 showing the engine of FIG. 5 positioned in the fixed pod structure.

Referring now to FIGS. 5 and 6, a second representative engine 32' is illustrated. This turbofan engine varies from the previously illstrated engine in that its longitudinal dimension is greater and the diametric dimensions of the fan casing are different. In this embodiment, no turbine nozzle adapter is necessary as the longitudinal dimension of the engine 32' allows the turbine outlet to be directly coupled to the forward edge of the fixed turbine. A second inlet adapter 40', designed specifically for the second engine 32' has been dimensioned to form an inlet channel 56' from the fixed inlet throat 18 to the forward peripheral portion of the fan casing. Moreover, the second inlet adapter 40' has been re-configured to provide a smooth transition between the inner rearward surface of the inlet adapter and the internal geometry of the fan casing. Likewise, a second set of fan duct adapters 42' and 44' have been specifically designed for the second engine to adapt the smaller diameter fan casing of the engine 32' to the fixed fan duct walls 20' and 22' so as to form a smooth, continuous, annularly shaped fan duct 34'. Likewise, a second fan nozzle adaper 46' has been specially designed to provide the requisite fan nozzle area for the engine 32'. The turbine nozzle plug 60' has also been configured relative to the internal dimensions of the fixed turbine nozzle structure 24' so as to provide the requisite turbine nozzle area for the second engine 32'.

Still other engines from different manufacturers can be mounted in the fixed pod structure 10 by employing appropriately shaped and dimensioned inlet, fan duct, and fan nozzle adapters, and if necessary, turine nozzle adapters. One of oridinary skill in the art of designing and manufacturing jet engine pods will also recognize that the fixed pod structure of the present invention has advantageous in addition to those previously enumerated. For example, fan thrust reversers can be associated with the fixed portions of the outer and inner fan duct walls 20 and 22 so that the identical reversing mechanisms can be employed with each of the variety of engines. Moreover, fixed, primary thrust reversers can be associated with the turbine nozzle 24 and the aft portion of the inner fan duct wall 22 so that identical primary thrust reversing mechanisms can be used with each of the various engines. Although the present invention has been disclosed in relation to a preferred embodiment, one of ordinary skill in the art, after reading and the foregoing specification will be able to make various alterations, substitutions of equivalents and other changes without departing from the broad concept disclosed. It is, therefore, intended that the protection granted by Letters Patent hereon be limited only by the definition contained in the appended claims.

What is claimed is:

1. A pod for housing a turbofan jet propulsion engine selected from a plurality of different turbofan engines, said engine having a fan casing, a fan, a turine engine a turbine engine casing and a turbine outlet, said fan casing having a forward end defining a fan entrance plane and a rearward end defining a fan exit plane, said pod comprising:

an outer, annularly shaped, cowl member having a center line and a predetermined datum plane oriented transversely to the center line of said cowl member, said cowl member surrounding said center line and extending longitudinally from its forward end located forwardly of said datum plane to a rearward end located rearwardly of said datum plane, the forward end of said cowl member being radially convergent as it extends forwardly, an annular inlet throat adjacent the forward end of said cowl member and being disposed about said cowl center line, the forward end of said throat being radially divergent as it extends forwardly and merging with the forward enf of said cowl member to form an inlet highlight, said throat terminating in a rearward edge defining a throat oriented transversely to the cowl center line and located forwardly of datum said plane and forwardly from said fan entrance plane when said engine is positioned in said pod, an outer, angularly shaped, fan duct wall disposed about said cowl center line and being spaced radially inwardly from said cowl member, said outer fan duct wall having a forward end terminating in a forward edge defining a first plane oriented transversely to said center line, located rearwardly from said datum plane and spaced rearwardly from said fan exit plane when said engine is positioned in said pod, said outer fan wall having a rearward edge and being fixed to said cowl member adjacent the rearward end thereof, an annular turbine nozzle disposed about said cowl center line and spaced radially inwardly from said cowl member, the rearward end of said turbine nozzle forming a nozzle opening defining a turbine nozzle exit plane located rearwardly from said datum plane, said nozzle extending forwardly from said turbine nozzle exit plane and terminating in a forward edge defining a turbine nozzle entrance plane oriented transversely to said center line and positioned rearwardly from said datum plane, an inner, annularly spaced, fan duct wall spaced radially inwardly from said outer fan duct wall, the forward end of said inner fan duct wall terminating in a forward edge defining a second plane oriented transversely to said center line and located rearwardly from said datum plane, spaced rearwardly from said fan exit plane when said engine is positioned in said pool, and located forwardly of said turbine nozzle entrance, plane, said inner fan duct wall being located radially outwardly from said turbine engine casing when said engine is positioned in said pod, said inner fan duct wall converging toward said turbine nozzle as it extends rearwardly, and having a rearward end affixed to said turbine nozzle.

2. The pod of claim 1 wherein said first and second planes are substantially coplanar.

3. The pod of claim 2 wherein the rearward end of said inner fan duct wall merges into said tubular nozzle, the outer surface of said inner fan duct wall and the outer surface of said turbine nozzle forming a smooth, continuous, rearwardly extending surface.

4. The pod of claim 1 further comprising:

an annular inlet adapter having a forward edge mating with the rearward edge of said throad and extending rearwardly therefrom, the rearward portion of said inlet adapter terminating in a rearward edge capable of attachment to the forward peripheral edge of said fan casing when said engine is positioned in said pool to form an inlet channel for said engine, an outer, annular, fan duct adatper disposed about said cowl center line and having a rearward edge mating with a forward edge of said outer fan duct wall and extending forwardly therefrom, said outer fan duct adapter having a forward edge capable of being affixed to the rearward peripheral portion of said fan casing when said engine is positioned in said pod, an inner, annular, fan duct adapter disposed about said cowl center line and having a rearward edge mating with the forward edge of said inner fan duct wall and extending forwardly therefrom, said inner fan duct adapter having a forward edge capable of being affixed to said fan casing when said engine is positioned in said pod, said inner fan duct adapter being spaced outwardly from said turbine engine when said engine is positioned in said pod, said outer and inner fan duct adapters being so constructed to form an annular channel to receive fan air propelled rearwardly from said fan and to channel said fan air rearwardly into the annular duct formed between said inner and outer fan duct walls.

5. The pod of claim 4 further comprising:

an annular fan nozzle adapter disposed about and located radially outwardly from said inner fan duct wall adjacent the rearward end of said cowl member and said outer fan duct wall, said fan nozzle adapter terminating in a rearward edge defining a plane oriented transversely to said cowl center line and located rearwardly from said datum plane, said fan nozzle adapter defining in cooperation with the outer surface of said inner fan duct wall to annular fan nozzle outlet of predetermined size corresponding to the requirements of said predetermined engine.

6. The pod of claim 5 further comprising:

an annular turbine nozzle having a rearward edge adapted to mate with the forward edge of said turbine nozzle at said turbine nozzle entrance plane and having a forward edge adapted to be affixed to said turbine outlet when said engine is positioned in said pod, said turbine nozzle adapter being constructed to channel exhaust gases from said turbine outlet into said turbine nozzle when said engine is positioned in said pod.

7. In combination with a jet propulsion engine having a turbine casing enclosing a turbine engine and a fan casing enclosing a fan driven by said turbine engine, said jet propulsion engine having a center line, said fan casing having a forward, peripheral edge, an outer, rearwrd, peripheral edge, and an inner, rearward edge, said rearward edges defining a datum plane oriented transversely to said center line, said forward edge defining a fan entrance plane oriented transversely to said center line, said turbine engine having a rearward opening defining a turbine exit plane oriented transversely to said center line, a pod for housing said jet propulsion engine comprising:

an outer, annularly shaped, cowl member surrounding said engine and said center line and extending longitudinally from a forward end located forwardly of said datum plane to a rearward end located rearwardly of said datum plane, the forward end of said cowl member being radially convergent as it extends forwardly, an annular inlet throat located adjacent and spaced inwardly from the forward end of said cowl member, said throat having a diameter less than the diamter of said cowl member at a location spaced radially outwardly from said throat, the forward end of said throat being radially divergent as it extends forwardly and merging with the forward end of said cowl member to form an inlet throat highlight, said inlet terminating in a rearward edge defining a throat plane oriented transversely to said center line and located forwardly of said datum plane, an interchangeable, annular, inlet adapter having a forward edge mating with the rearward edge of said throat at said throat plane and extending rearwardly therefrom, the rearward portion of said inlet adapter terminating in a rearward edge mating with the forward peripheral edge of said fan casing, an outer, annular, fan duct wall disposed about said turbine engine and said center line and being spaced radially inwardly from said cowl member, said fan duct wall having a forward end terminating in a forward edge defining a first plane oriented transversely to said center line and located rearwardly from said datum plane, said outer fan duct wall having a rearward edge and being fixed to said cowl member adjacent the rearward end thereof;

an annular turbine nozzle disposed about said center line and spaced radially inwardly from said cowl, the rearward end of said turbine nozzle forming a nozzle opening defining a nozzle exit plane located rearwardly from said datum plane and oriented transversely to said center line, said nozzle extending forwardly from said exit plane and terminating in a forward edge defining a nozzle entrance plane oriented transversely to said center line and positioned rearwardly from said datum plane, means for coupling the forward edge of said nozzle to said turbine engine at said turbine exit plane, an inner, annularly shaped, fan duct wall spaced radially inwardly from said outer fan duct wall, said inner fan duct wall having a forward end terminating in a forward edge defining a second plane oriented transversely to said center line and located rearwardly from said datum plane and forwardly of said nozzle entrance plane, said inner fan duct wall converging toward said nozzle as it extends rearwardly and having a rearward end affixed to said nozzle, an interchangeable, outer, annular fan duct adapter disposed about said engine and having a rearward edge mating with the forward edge of said outer fan duct wall and extending forwardly therefrom, said outer fan duct adapter having a forward edge mating with the outer rearward edge of said fan casing, and an interchangeable, inner, annular, fan duct adapter disposed about said engine and located radially inwardly from said outer fan duct adapter, said inner fan duct adapter having a rearward edge mating with the forward edge of said inner fan duct wall and extending forwardly therefrom, said inner fan duct adapter having a forward edge mating with an inner, rearward edge of said fan casing, said inner and outer fan duct adapters being so constructed to form an annular channel to receive fan air from said fan and to channel said fan air rearwardly from said fan into the annular fan duct formed between said inner and outer fan duct walls.

8. The pod of claim 7 wherein said first and second planes are substantially coplanar.

9. The pod of claim 8 wherein the rearward end of said inner fan duct wall merges into said nozzle, the outer surface of said inner face duct wall and said nozzle forming a smooth, continuous, rearwardly extending surface.

10. The pod of claim 7 further comprising:
an annular fan nozzle adapter disposed about and located radially outwardly from said inner fan duct wall adjacent the rearward end of said cowl member and said outer fan duct wall, said fan nozzle adapter terminating in a rearward edge defining a plane oriented transversely to said center line and located rearwardly from said datum plane, said fan nozzle adapter defining, in cooperation with the outer surface of said inner fan duct wall, an annular fan nozzle outlet of predetermined area corresponding to the requirments of said predetermined engine.

11. The pod of claim 7 wherein said means for coupling said nozzle to said turbine engine comprises:
an annular turbine nozzle adapter having a rearward edge mating with the forward edge of said nozzle at said nozzle entrance plane and having a forward edge adapted to be affixed to the turbine outlet of said engine at said turbine exit plane, said nozzle adapter being constructed to channel exhaust gases from the turbine of said turbine engine into said nozzle.

* * * * *

UNITED STATES PATENT AND TRADEMARK OFFICE
CERTIFICATE OF CORRECTION

PATENT NO. : 4,043,522
DATED : August 23, 1977
INVENTOR(S) : Earl E. Vetter

It is certified that error appears in the above-identified patent and that said Letters Patent are hereby corrected as shown below:

Column 8, line 67: delete "turine" and insert therefor —turbine—; insert a comma (—,—) after the word "engine", second occurrence.

Column 9, line 17: delete "enf" and insert therefor —end—.

Column 9, line 21: delete "datum said" and insert therefor —said datum—.

Column 9, line 33: after "fan" insert —duct—.

Column 9, line 54: delete the comma "," after the word "entrance".

Column 9, line 64: delete "tubular" and insert therefor —turbine—.

Column 10, line 2: delete "throad" and insert therefor —throat—.

Column 10, line 40: delete the word "to" and insert therefor —an—.

Column 10, line 45: after "nozzle" insert the word —adapter—.

Column 10, line 59: delete "rearwrd" and insert therefor —rearward—.

Column 11, line 13: delete the word "throat".

Column 11, line 14: after "inlet" insert —throat—.

Column 12, line 27: delete "face" and insert therefor —fan—.

Column 12, line 41: delete "requirments" and insert therefor —requirements—.

Signed and Sealed this

Twenty-first Day of March 1978

[SEAL]

Attest:

RUTH C. MASON
Attesting Officer

LUTRELLE F. PARKER
Acting Commissioner of Patents and Trademarks